United States Patent [19]

Sikorski

[11] 3,866,739

[45] Feb. 18, 1975

[54] FREE FLOW DEVICE FOR CONTAINER UNSCRAMBLERS

[75] Inventor: Thaddeus John Sikorski, Park Ridge, Ill.

[73] Assignee: Standard Metal Products, Franklin Park, Ill.

[22] Filed: Feb. 28, 1973

[21] Appl. No.: 336,450

[52] U.S. Cl. .................................. 198/30, 198/32
[51] Int. Cl. ........................................... B65g 47/26
[58] Field of Search ...................... 198/32, 30, 76

[56] References Cited
UNITED STATES PATENTS

| | | | |
|---|---|---|---|
| 2,998,118 | 8/1961 | Menacci et al. .................. | 198/30 |
| 3,707,216 | 12/1972 | Peres ................................ | 198/32 X |

*Primary Examiner*—Evon C. Blunk
*Assistant Examiner*—Douglas D. Watts
*Attorney, Agent, or Firm*—Hill, Gross, Simpson, Van Santen, Steadman, Chiara & Simpson

[57] ABSTRACT

A padded bar is mounted as a deflector across the path of side by side progressive speed advancing conveyors to divert containers randomly placed thereon toward single file orientation on a maximum speed take away conveyor. Oscillation of the bar jogs the containers to prevent jamming.

12 Claims, 3 Drawing Figures

3,866,739

Patented Feb 18 1975

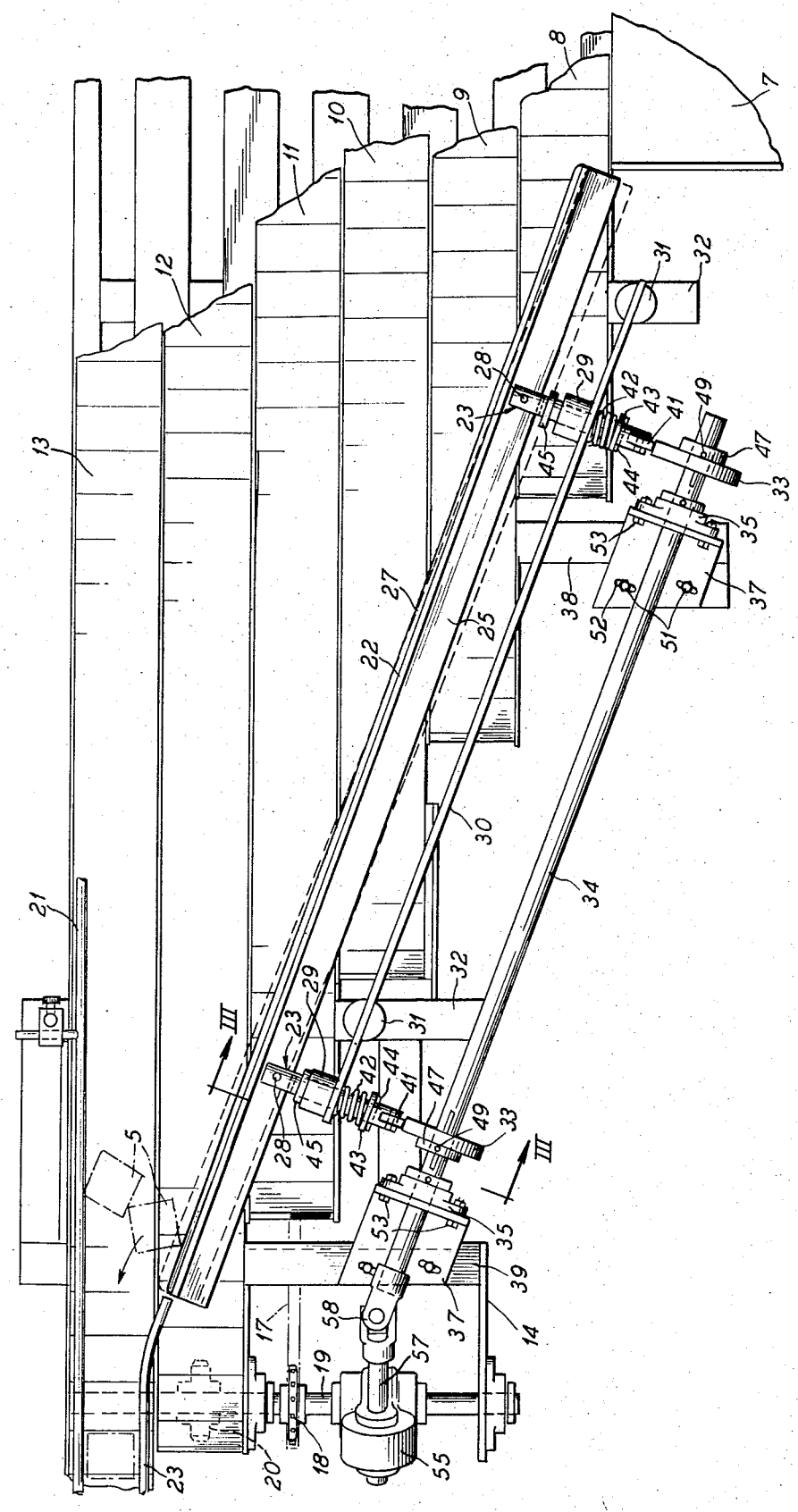

3,866,739

FREE FLOW DEVICE FOR CONTAINER UNSCRAMBLERS

This invention relates to free flow devices for container unscramblers, and is more particularly concerned with a new and improved method of and means for single file orientation of randomly placed containers or the like on an unscrambler conveyor system.

Apparatus of the type commonly referred to as unscramblers are utilized in handling containers for single file orientation although dumped haphazardly onto the unscrambler. Heretofore a fixed deflecting bar has been employed to nudge the containers toward the take away conveyor. Where cylindrical containers are being handled no special problem of jamming has been experienced because the symmetrically cylindrical perimeters freely cam and accommodate to one another as the containers converge toward the take away conveyor. However where the container perimeters are other than round, jamming is often experienced, sometimes only resulting in slow-down but often causing damage to the apparatus or the containers.

An important object of the present invention is to overcome the foregoing and other disadvantages, deficiencies, inefficiencies, shortcomings and problems in prior art methods and structures for handling containers on unscramblers, and to attain important advantages and improvements as will hereinafter become apparent.

Another object of the invention is to provide new and improved method of and means for handling objects such as containers on an unscrambler conveyor system in a free flowing manner.

A further object of the invention is to provide a new and improved device for assuring the freedom from jamming of objects such as containers on an unscrambler.

Yet another object of the invention is to provide a new and improved jogger for unscramblers.

Other objects, features and advantages of the invention will be readily apparent from the following description of a preferred embodiment thereof, taken in conjunction with the accompanying drawings although variations and modifications may be effected without departing from the spirit and scope of the novel concepts embodied in the disclosure, and in which:

FIG. 2 is a fragmentary top plan view of the unscrambler.

Figure 1:
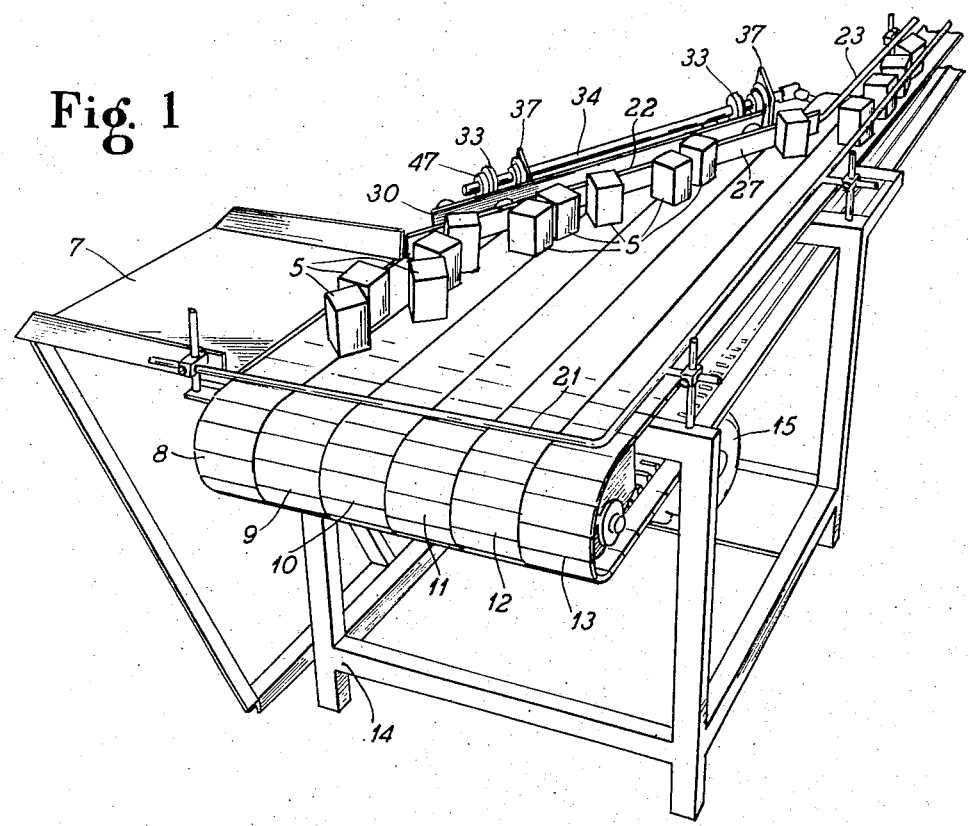
FIG. 1 is a perspective view of an unscrambler embodying features of the invention.

In a representative unscrambler as shown in FIGS. 1 and 2, containers 5 are dumped as from carrying trays or boxes onto a loading table 7, in this instance located at one side of a conveyor system comprising side by side progressive speed conveyors including, in this instance, parallel, coplanar conveyor belts 8, 9, 10, 11, 12 and 13 in which the conveyor 13 is the take away conveyor toward which the containers are to be shunted for single file onward travel. Support for the table 7 and the conveyors 8-13 is provided by a suitable frame 14 which also provides support for driving means for the conveyor system including a motor 15. Container driving power of the motor 15 is applied through transmission means including a drive chain 17 drivingly engaging with a sprocket 18 drivingly mounted on a shaft 19 rotatably supported on the frame 14 transversely relative to the conveyors and operative to drive at least one of the conveyors by means of a cogwheel 20. In a known manner, the conveyor belts 8 to 13, inclusive, are drivingly connected with the power source such as the motor 15 in a manner to travel at progressively greater speed, the conveyor 8 along side the table 7 traveling at the slowest speed, and each successive one of the conveyors traveling at a slightly greater differential speed, with the take away conveyor 13 traveling at the maximum speed. In addition, each of the conveyors may, as best seen in FIG. 2, be of progressively greater length from the conveyor 8 to the conveyor 13. The containers 5 after being dumped onto the table 7 are pushed over onto the conveyor system and advanced by the conveyors progressively toward a take away point.

Means for maintaining the containers on the conveyor system comprise a retaining curb bar 21 suitably supported across the back end of the conveyor and along the side of the conveyor assembly opposite to the side on which the table 7 is located. At the opposite side of the conveyor system forwardly or downstream relative to the table 7, the containers 5 are shunted progressively toward the take away conveyor 13 as the containers are advanced by the successive conveyors 8, 9, 10, 11 and 12. For this purpose a container deflecting or shunt bar 22 is provided which extends from closely adjacent to the table 7 diagonally across the conveyors to the adjacent side of the take away conveyor 13 where a guide bar 23 spaced from the curb bar 21 along the opposite side of the conveyor 13 from the bar 21 cooperates therewith in channeling the containers 5 single file onto and along the conveyor 13.

Conventionally a shunting bar positioned like the bar 22 is mounted fixedly, but where the containers have been of non-round circumference, jamming has often resulted at or adjacent to the throat defined at the convergence of the rigid shunting bar and the curb bar 21. For illustrative purposes the containers have been shown as square, but it will be understood that any other non-round perimeter containers would be subject to the same jamming tendency. In FIG. 2 two of the containers 5 are indicated as in a jam prone disposition.

Figure 3:
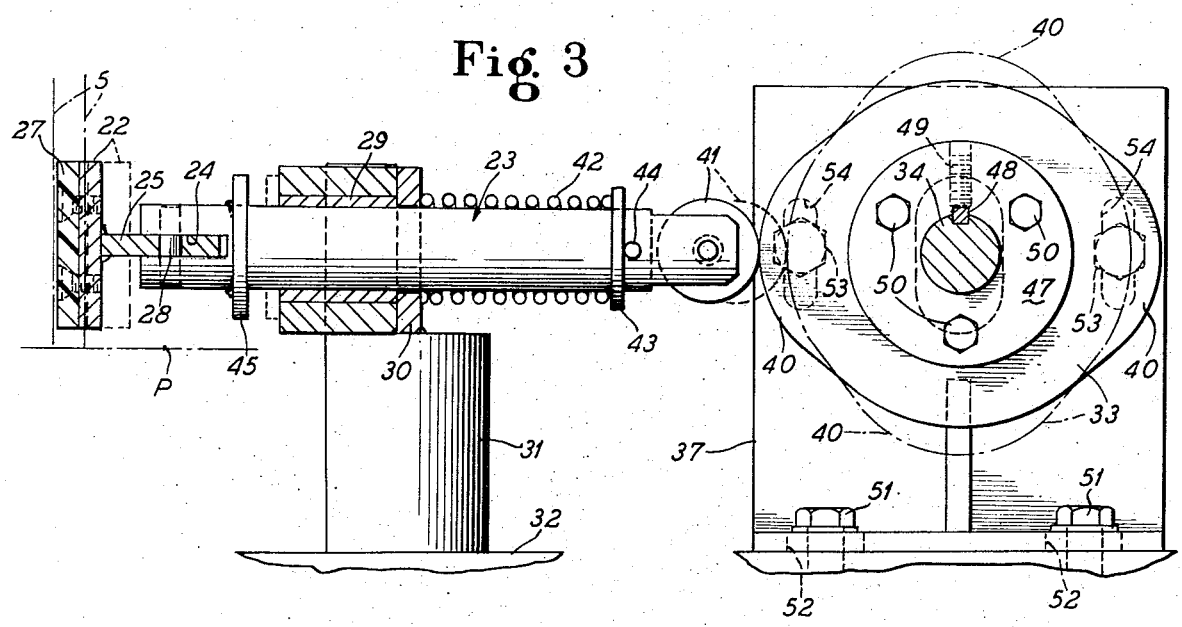
FIG. 3 is an enlarged sectional elevational view taken substantially along the line III—III of FIG. 2.

According to the present invention, the containers 5 are jogged along the shunting bar 22 in a manner to preclude jamming and to assure free flow advance of the containers to and onto the take away conveyor 13. To this end, the bar 22 is oscillatably mounted and arranged to be oscillatably driven. Mounting means comprise a pair of horizontally mounted reciprocable plungers 23 (FIG. 2 and 3) having bar-supporting ends provided with respective transverse slots 24 within which is slidably engaged a longitudinal fin 25 rigid with the back face of the bar 22 in substantially T-formation relation to the bar which has a substantial width in vertical plane and providing a container engaging face which is desirably equipped with a layer of cushioning material 27 therealong. Within the slots 24, the fin 25 is secured pivotally as by means of respective pivot pins 28. Means for reciprocably supporting the plungers 23 comprising respective bushing bearing assemblies 29 rigidly mounted on a horizontal bar 30 which is fixedly mounted on spaced posts 31 on pier portions 32 of the frame 14 clear of the conveyor assembly. Through this arrangement, the bar 22 is supported in the desired oblique container shunting relation relative to and in closely spaced relation above the plane of the conveyor assembly identified at P in FIG. 3.

By having the plungers 23 located adjacent to respective opposite end portions of the bar 22 oscillation of the bar can be effected by reciprocating either of the plungers 23 to oscillate the bar 22 about the fulcrum provided by the pivot 28 of the other of the plungers. Bar oscillating reciprocations of the plungers 23 is conveniently effected by means of respective cams 33 corotatably mounted on a cam shaft 34 in spaced horizontal alignment with the back ends of the plungers 23 and rotatably journaled in axially spaced bearings 35 supported by respective brackets 37 on suitable piers 38 and 39 on the frame 14. Each of the cams 33 has a lobed perimeter, herein comprising in each instance a pair of diametrically opposite cam lobes 40. Each of the plungers 23 carries on its end adjacent the associated cam 33 a follower wheel 41 which rides the cam perimeter. Means for normally biasing the plungers 23 toward the cams comprise respective coiled compression springs 42 thrusting at one end against the bar 30 and at the opposite end against a thrust collar 43 held in position to maintain the spring under compression by means of a transverse pin 44 in the plunger. Stop means in the form of a fixed collar 45 on the front or head end of each of the plungers 23 limits the rearward thrust of the spring 42 to the low points on the cam wheels so that adjustments of the cam can be readily effected. It would be observed that as the cam 33 rotates, the plunger will be alternately driven inwardly toward the conveyor assembly and returned outwardly as the follower 41 rides onto and off of the lobes 40, and the bar 22 will therefore be correspondingly driven inwardly and outwardly, as indicated in the full line position in comparison with the dashed position in FIG. 3.

Optimum operating adjustment of the cams 33 is adapted to be effected. Thus, for angular adjustments the cam wheels 33 are mounted on respective hubs 47 which are keyed by means of feather keys 48 to the shaft 34 and adjustable longitudinally along the shaft and locked in adjusted position by means of set screws 49. Securing means comprising bolts 50 secure the cam 33 in preferred angular position on the hub 47 relative to the shaft 34. Adjustment of the position of the shaft 34 in a horizontal direction relative to the plungers 23 is adapted to be effected by adjustably mounting the brackets 37, securing the brackets by means of bolts 51 extending through slots 52 elongated in the adjustment direction in the base flanges of the brackets. Optimum vertical adjustments of the shaft 34 are adapted to be effected by mounting the bearings 35 for vertical adjustment by means of bolts 53 extending through vertically elongated bolt holes 54 in the vertical flanges of the brackets. By preference, the cams 33 are adjustably fixed on the shafts 34 to have the lobes 40 of the respective cams engage the associated plunger followers 41 alternately so that when one of the cam lobes 40 thrusts its associated plunger inwardly, the other plunger has its follower riding a low point of its cam. Thereby as the shaft 34 rotates the bar 22 is oscillated as indicated by comparison of the full line and dash line positions in FIG. 2. Such oscillation jogs the containers 5 traveling along the bar 22 gently to assure free flow of the containers toward and onto the take away conveyor 13, jogging of the container 5 nearest the bar 22 to prevent a hangup or jam being indicated by directional arrow in FIG. 2.

Means are provided for driving the shaft 34 from the same power source that drives the conveyor, mainly from the driven shaft 19. To this end, suitable transmission gear means 55 translate rotary motion of the shaft 19 to a stub shaft 57 which is connected by means of a universal joint 58 with the adjacent end of the shaft 34. Accordingly, when the conveyor system is driven, including the driving power transmitted through the flexible driving member chain 17 and the shaft 19, the shaft 34 is concurrently driven.

In operation, containers unloaded from receptacles onto the table 7 are pushed over onto the running conveyor system and more particularly onto the nearest conveyor 8 and possibly also onto the mixed adjacent conveyor 9 and 10. All of the conveyors 8, 9, 10, 11, 12, 13 travel in operation toward or at least converge toward the deflector, flow controlling jogger bar 22 so that on reaching the bar 22 the containers are shunted diagonally toward the take away conveyor 13. By having the conveyors traveling at progressively greater speed from the conveyor belt 8 to the receiving conveyor belt 13, the containers are gradually separated as they advance along and are shunted by the bar 22 from conveyor to conveyor. Any tendency of the containers to catch on one another or hang up or jam any place along the bar 22, and more especially at the receiving guide throat where they move onto the take away conveyor 13, is controlled and obviated by the horizontal oscillatory jogging movements imparted to the bar 22. Although for some types of containers, merely oscillatively vibrating the bar 22 by actuating it adjacent to its forward or delivery throat end and about a fulcrum adjacent to its opposite end may suffice, improved action and flow control are attained by the dual oscillatory actuation wherein the bar is alternately rocked about the two vertical axes provided by the pins 38 adjacent to the opposite ends of the bar. This causes initial separating jogging of the containers where they are generally in the greatest mass concentration at the beginning of their forward travel beyond the delivery table 7 so that by the time the containers reach the vicinity of the take away conveyor 13 they are already reasonably separated and flow reasonably smoothly onto the take away conveyor. Any further tendency of two or more of the containers 5 to enter into jamming contact at the delivery throat is most efficiently counteracted by the jogging effect of the horizontally oscillating forward end portion of the bar 22. By having the entire container facing surface of the bar 22 covered by the strip of cushioning material 27, not only are the containers protected against damage from jogging contact of the bar with the containers, but contact with the containers is silient because of the shock absorbing, sound deadening effect of the buffer strip 27. In addition, as the buffer strip 27 contacts the containers motivated onwaard by the respective conveyors on which the containers may be riding at any point along the length of the bar 22, the frictional character of the strip 27 imparts a slight counterclockwise spinning motion to the contacted containers as generally indicated by the directional arrow in FIG. 2, causing them to disengagingly nudge contacting containers and thereby enhance free flow of the containers into single file on the take away conveyor 13.

It will be understood that variations and modifications may be effected without departing from the spirit and scope of the novel concepts of this invention.

I claim as my invention:

1. Apparatus for unscrambling containers, comprising:
   a take away conveyor;
   a shunting bar converging toward said take away conveyor;
   means for conveying containers to and along the shunting bar toward the take away conveyor;
   means for vibrating the shunting bar to assure free flow movement of the containers from the bar onto the take away conveyor; and
   means on the bar for effecting spinning of the containers which contact the bar by being propelled theretoward by said conveying means, and wherein said means for effecting spinning comprises a frictional cushioning strip attached to and providing a facing of substantial thickness along the bar for engagement by the containers.

2. Apparatus according to claim 1, wherein said means for conveying containers to and along the shunting bar comprise a plurality of progressive parallel conveyors and means for driving the parallel conveyors at progressively greater speed from the end of the bar remote from the take away conveyor to the take away conveyor.

3. Apparatus for unscrambling containers, comprising:
   a take away conveyor;
   a shunting bar converging toward said take away conveyor;
   means for conveying containers to and along the shunting bar toward the take away conveyor;
   means for vibrating the shunting bar to assure free flow movement of the containers from the bar onto the take away conveyor;
   said bar being mounted for oscillation about fixed vertical axes adjacent to opposite ends thereof;
   said vibrating means operating to oscillate opposite ends of the bar alternately to effect said vibrating thereof; and
   said means for conveying containers to and along the shunting bar comprising a plurality of progressive parallel conveyors and means for driving the parallel conveyors at progressively greater speed from the end of the bar remote from the take away conveyor to the take away conveyor.

4. Apparatus according to claim 3, including means on said bar for effecting spinning of the containers while contacting the bar.

5. Apparatus according to claim 3, wherein said conveying means comprise endless conveyor belt structure, means for driving said endless belt structure toward said bar including a rotary shaft, said means operating to oscillate opposite ends of the bar including a rotary shaft extending generally parallel to the bar on an axis which is angular to the axis of said conveyor driving means shaft, and means including a universal coupling connecting said conveyor driving means shaft drivingly with said oscillating means shaft.

6. Apparatus according to claim 3, wherein said means operating to oscillate opposite ends of the bar comprise a fixedly mounted supporting bar extending generally parallel to said shunting bar, respective plungers reciprocably supported by respective opposite end portions of said supporting bar, means pivotally attaching said plungers in supporting relation to said shunting bar, and means for reciprocably driving said plungers to effect oscillations of said shunting bar.

7. Apparatus according to claim 6, each of said plungers having a cam follower on its end opposite to said shunting bar, a cam shaft rotatably mounted parallel to said supporting bar and adjacent to said followers, respective lobed cams corotatable with said shaft and engaged by said followers, and means for driving said shaft to rotate the cams, said cams having the lobes thereof arranged to effect reciprocations of the plungers alternately oppositely for oscillating said shunting bar.

8. Apparatus according to claim 7, including means for adjusting said shaft relative to said plungers and for adjusting said cams relative to said followers.

9. Apparatus according to claim 3, including means for effecting spinning of the containers which contact the bar and comprising a frictional cushioning facing along the bar for engagement by the containers.

10. Apparatus for unscrambling containers, comprising:
    a take away conveyor;
    a shunting bar converging toward said take away conveyor;
    means for conveying containers to and along the shunting bar toward the take away conveyor;
    means for vibrating the shunting bar to assure free flow movement of the containers from the bar onto the take away conveyor;
    means on the bar for effecting spinning of the containers which contact the bar; and
    said means conveying containers to and along the shunting bar comprising a plurality of progressive parallel conveyors and means for driving the parallel conveyors at progressively greater speed from the end of the bar remote from the take away conveyor to the take away conveyor.

11. Apparatus for unscrambling containers, comprising:
    a take away conveyor;
    a shunting bar converging toward said take away conveyor;
    means for conveying containers to and along the shunting bar toward the take away conveyor;
    means for vibrating the shunting bar to assure free flow movement of the containers from the bar onto the take away conveyor;
    said bar being mounted for oscillation about fixed vertical axes adjacent to opposite ends thereof;
    said vibrating means operating to oscillate opposite ends of the bar alternately to effect said vibrating thereof;
    said means operating to oscillate opposite ends of the bar comprising a fixedly mounted supporting bar extending generally parallel to said shunting bar, respective plungers reciprocably supported by respective opposite end portions of said supporting bar, means pivotally attaching said plungers in supporting relation to said shunting bar, and means for reciprocably driving said plungers to effect oscillations of said shunting bar; and
    wherein each of said plungers has a cam follower on its end opposite to said shunting bar, a cam shaft rotatably mounted parallel to said supporting bar and adjacent to said followers, respective lobed cams corotatable with said shaft and engaged by said followers, and means for driving said shaft to rotate the cams, said cams having the lobes thereof arranged to effect reciprocations of the plungers alternately oppositely for effecting said oscillations of said shunting bar.

12. Apparatus according to claim 11, including means for adjusting said shaft relative to said plungers and for adjusting said cams relative to said followers.

* * * * *

UNITED STATES PATENT OFFICE
CERTIFICATE OF CORRECTION

PATENT NO. : 3,866,739
DATED : February 18, 1975
INVENTOR(S) : Sikorski

It is certified that error appears in the above-identified patent and that said Letters Patent are hereby corrected as shown below:

Column 4, line 39, for "38" read --28--.

Signed and Sealed this second Day of September 1975

[SEAL]

Attest:

RUTH C. MASON
Attesting Officer

C. MARSHALL DANN
Commissioner of Patents and Trademarks